United States Patent [19]
Ackerman

[11] Patent Number: 5,884,720
[45] Date of Patent: Mar. 23, 1999

[54] PARKING DEVICE FOR VEHICLES

[75] Inventor: Itay Ackerman, Bat Yam, Israel

[73] Assignee: Jacob Ackerman, Bat Yam, Israel

[21] Appl. No.: 607,116

[22] Filed: Feb. 26, 1996

[51] Int. Cl.$^6$ ........................................ B60S 9/21
[52] U.S. Cl. ..................... 180/199; 180/202; 254/418; 254/426
[58] Field of Search ..................... 180/199, 200, 180/202; 280/761, 763.1; 254/418, 421, 424, 425, 426

[56] References Cited

U.S. PATENT DOCUMENTS

| | | | |
|---|---|---|---|
| 1,121,395 | 12/1914 | Possons | 180/200 |
| 1,709,421 | 4/1929 | Wiley . | |
| 1,928,305 | 9/1933 | Blakesley . | |
| 2,034,965 | 3/1936 | Truitt | 180/200 |
| 2,091,326 | 8/1937 | Mardovin | 180/200 |
| 2,784,793 | 3/1957 | Rando . | |
| 2,833,359 | 5/1958 | Allen . | |
| 3,011,575 | 12/1961 | Bouet | 180/200 |
| 3,185,237 | 5/1965 | Butterworth . | |
| 3,460,643 | 8/1969 | Henry-Biabaud . | |
| 3,589,461 | 6/1971 | Butterworth . | |
| 3,589,462 | 6/1971 | Inagaki . | |
| 3,623,562 | 11/1971 | Pitra . | |
| 4,211,299 | 7/1980 | Schulte . | |
| 4,369,854 | 1/1983 | Butterworth . | |
| 4,516,653 | 5/1985 | Walker . | |
| 4,605,086 | 8/1986 | Marom . | |
| 4,834,206 | 5/1989 | Ching-Tang . | |

FOREIGN PATENT DOCUMENTS

| | | |
|---|---|---|
| 327370 A2 | 8/1989 | European Pat. Off. . |
| 604248 | 4/1926 | France . |
| 1044118 | 11/1953 | France . |
| 1292524 | 12/1961 | Germany . |
| 16478 | 8/1963 | Israel . |
| 59-38176 | 3/1984 | Japan . |
| 2175553 | 12/1986 | United Kingdom . |

*Primary Examiner*—Victor E. Johnson
*Attorney, Agent, or Firm*—Mark M. Friedman

[57] ABSTRACT

A parking device attachable to one end of a vehicle understructure for use in parking the vehicle, includes a carriage and coupling mechanism which permits the carriage to move either to a retracted position or to a deployed vertically-spaced position, and a parking wheel having a pivotal mechanism which permits the parking wheel to be pivoted either to a folded, substantially horizontal position or to a deployed, substantially vertical position. A drive is coupled to the carriage and to the parking wheel and is effective, when the carriage is in its retracted position and the parking wheel is in its folded position, first to move the parking wheel to its deployed position and then to move the carriage to its deployed position lowering the parking wheel into engagement with the ground and raising the respective end of the vehicle off the ground.

20 Claims, 6 Drawing Sheets

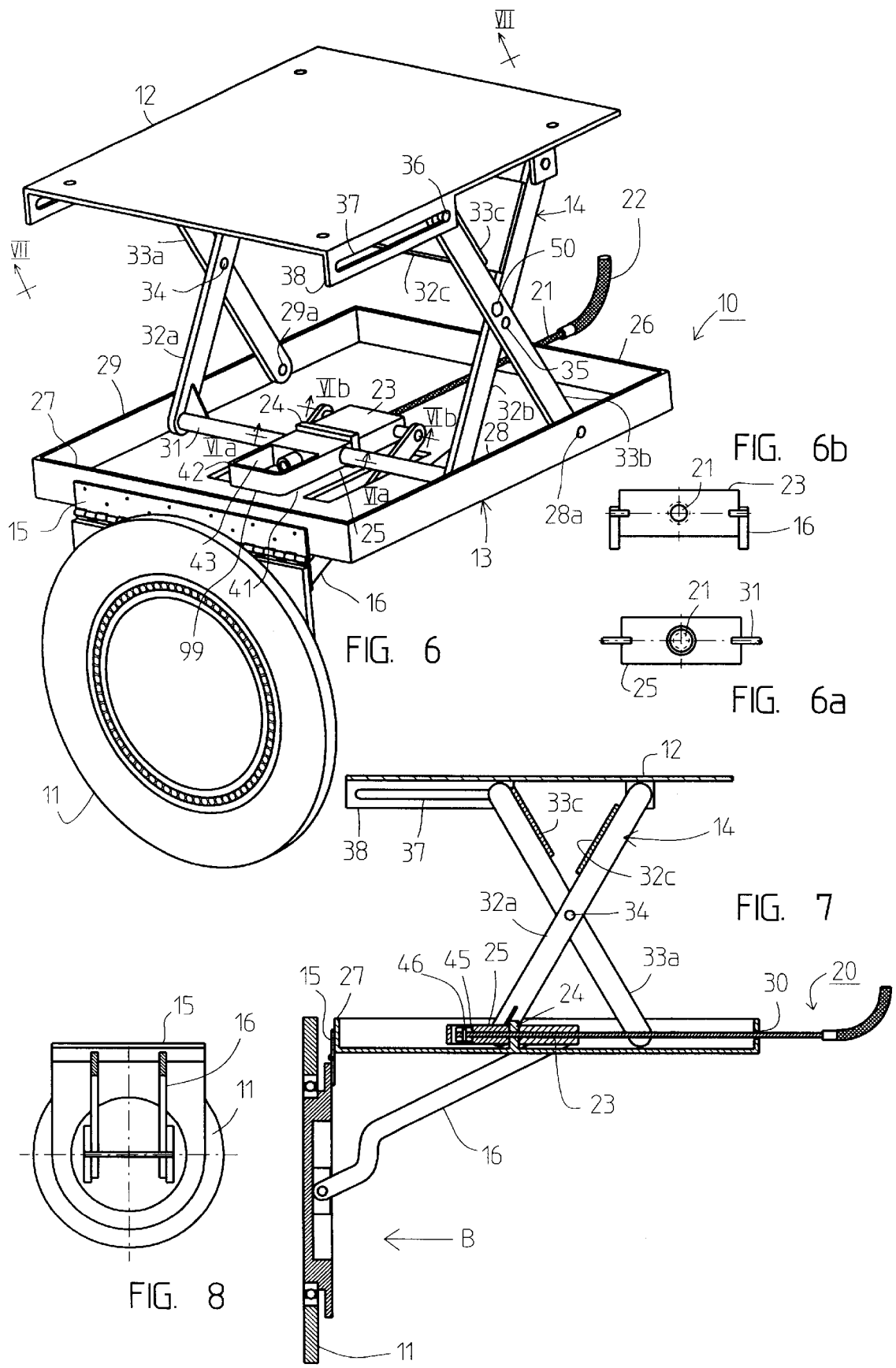

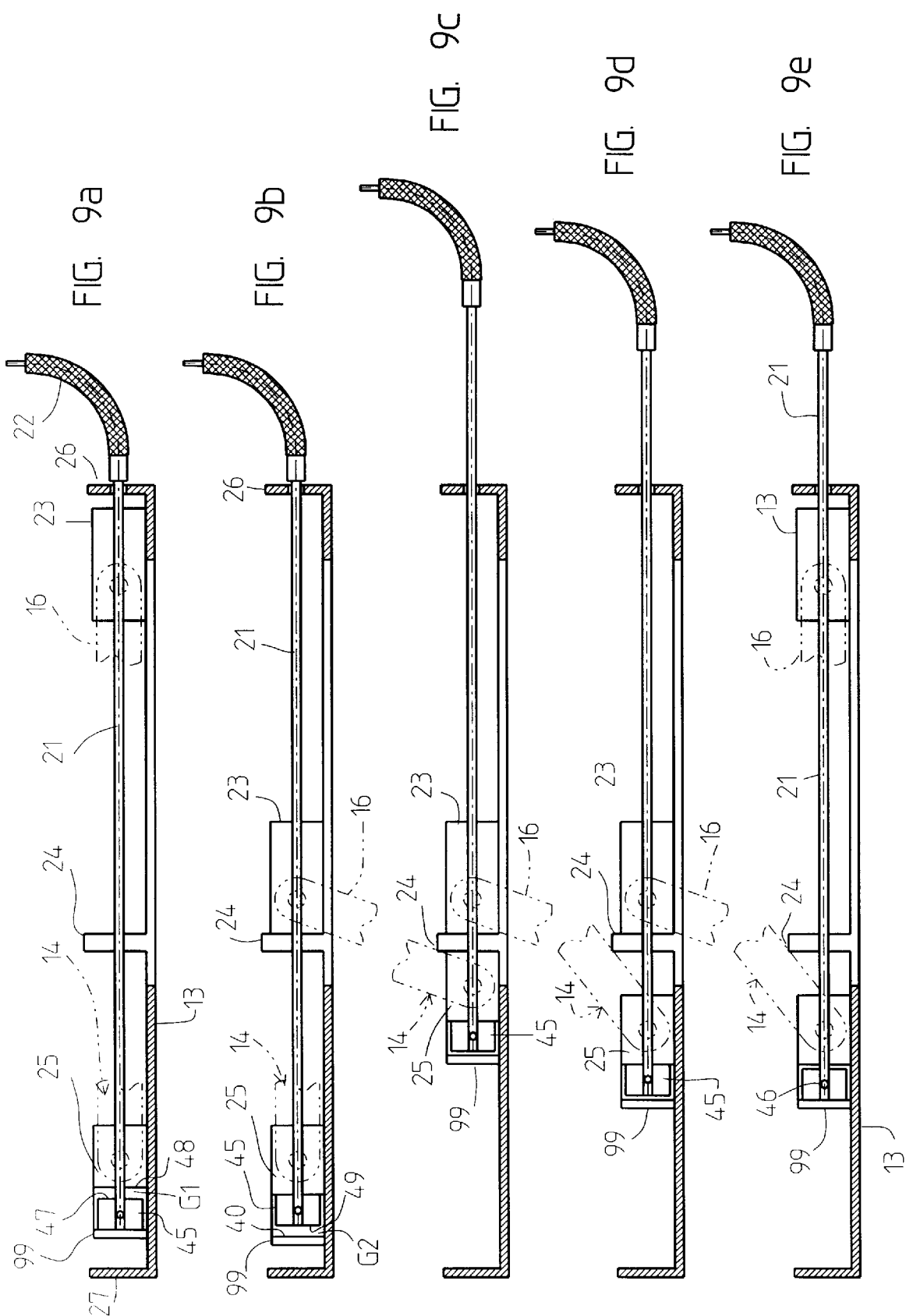

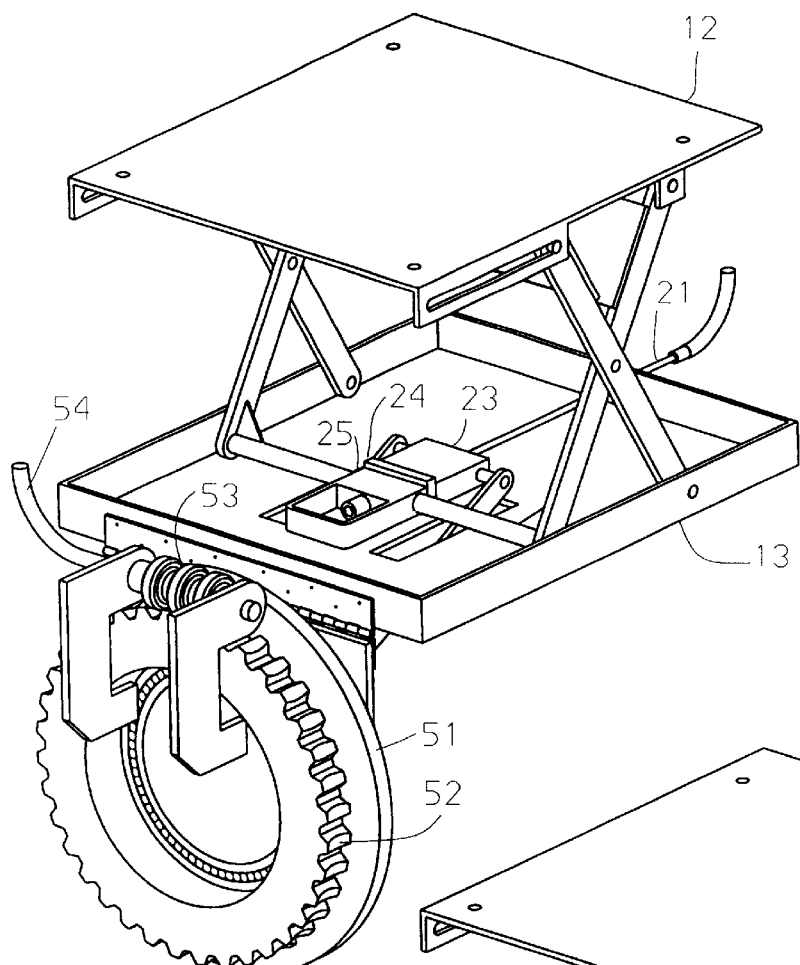
FIG. 10
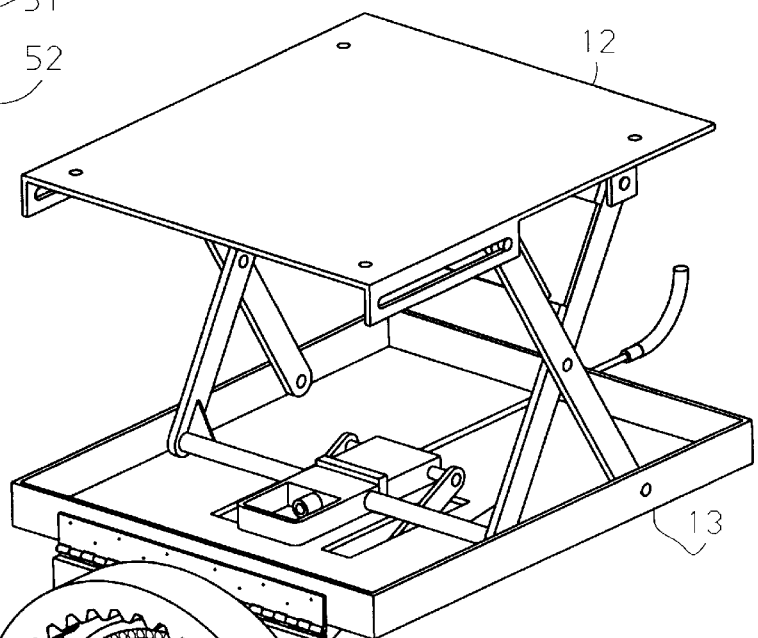
FIG. 11
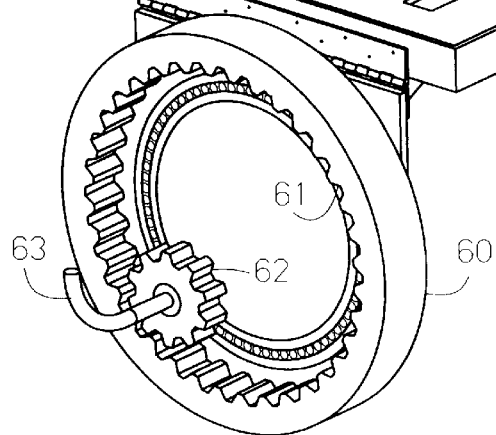

PARKING DEVICE FOR VEHICLES

FIELD AND BACKGROUND OF THE INVENTION

The present invention relates to parking devices for vehicles, and particularly to parking devices attachable to the understructure of a motor vehicle in order to facilitate parking the vehicle.

Motor vehicles equipped with standard stearing systems generally require a parking space which is substantially longer than the length of the vehicle, and even then the vehicle must frequently execute several rearward and forward movements in order to properly enter the parking space. Parking a vehicle therefore frequently results in a wastage of time and energy on the part of the driver, and also substantial interference with the flow of traffic during the time the driver is parking the vehicle. In addition, conventional parking does not efficiently exploit all the parking space available, since a parking space which is not sufficiently larger than the length of the vehicle to permit entering and leaving the parking space will be completely unuseable as a parking space.

Many different types of parking devices have been proposed in order to facilitate parking a motor vehicle. The most common type includes a parking wheel assembly mounted adjacent to the rear end of the vehicle. The wheel assembly is generally driven by a gear drive into an operative position into engagement with the pavement, to raise the rear end of the vehicle and to permit it to be maneuvered into the parking space.

However, insofar as I am aware, none of the previously proposed devices has yet found wide commercial use, presumably because of many drawbacks inherent in them.

OBJECTS AND BRIEF SUMMARY OF THE INVENTION

An object of the present invention is to provide a parking device for motor vehicles which can be easily attached to existing vehicle understructures, which may be easily deployed when needed for parking the vehicle, and which when not needed may be retracted into a compact condition. Another object of the present invention is to provide such a parking device of relatively simple construction which may be produced at relatively low cost.

According to the present invention, there is provided a parking device attachable to one end of a wheeled vehicle understructure for use in parking the vehicle, comprising: mounting means for mounting the parking device to the vehicle understructure; a carriage coupled to the mounting means by a coupling mechanism which permits the carriage to move either to a retracted position adjacent to the vehicle understructure or to a deployed position vertically spaced from the vehicle understructure; a parking wheel carried by the carriage by a pivotal mechanism which permits the parking wheel to be pivoted either to a folded, substantially horizontal position with respect to the carriage, or to a deployed substantially vertical position with respect to the carriage, to engage the ground in such manner to permit the respective end of the vehicle to move in the transverse direction with respect to the vehicle; and a drive coupled to the carriage and to the parking wheel and effective, when the carriage is in its retracted position and the parking wheel is in its folded position, to move the parking wheel to its deployed position with respect to the carriage, and then to move the carriage to its deployed position lowering the parking wheel into engagement with the ground and raising the respective end of the wheeled vehicle off the ground.

According to further features in the preferred embodiment of the invention described below, the drive is a screw and nut drive, and comprises a stop fixed with respect to the carriage, a nut on one side of the stop and movable towards and away therefrom, a slide on the opposite side of the stop and movable towards and away therefrom. The pivotal mechanism of the parking wheel to the carriage is coupled to the nut; and the coupling mechanism coupling the carriage to the mounting means is coupled to the slide. A screw is threaded through the nut and is coupled to the slide such that, when the carriage is in its retracted position, and the parking wheel is in its folded position, rotation of the screw in one direction first moves the nut to deploy the parking wheel until the nut engages the stop, and then further rotation of the screw in the same direction causes the screw to withdraw from the nut and thereby to move the slide towards the stop to deploy the carriage.

As will be described more particularly below, a parking device can be constructed in accordance with the foregoing features so as to take the form of a very compact assembly when in its fully retracted condition, and to be easily actuated to a deployed condition when it is to be used for parking a vehicle. Such a compact construction imposes a low aerodynamic resistance during the normal operation of the vehicle and also allows the use of large parking wheels producing smaller rolling resistance during parking. In addition, since the parking wheel is moved to a substantially vertical position when deployed, a shorter magnitude of displacement of the carriage is required when it is moved to its deployed position. Such a construction also requires a relatively few simple parts that can be produced and assembled at relatively low cost.

Further features and advantages of the invention will be apparent from the description below.

BRIEF DESCRIPTION OF THE DRAWINGS

The invention is herein described, by way of example only, with reference to the accompanying drawings, wherein:

FIG. 6 illustrates the parking device in the fully deployed condition;

FIGS. 6a, 6b and 7 are sectional views along lines VIa—VIa, VIb—VIB and VII—VII, respectively;

FIG. 8 is a side elevational view of the parking wheel in the parking device while in the condition illustrated in FIG. 6;

FIGS. 9a, 9b, 9c, 9d and 9e illustrate five stages in the operation of the illustrated parking device;

FIG. 10 is a perspective view illustrating the parking device including one form of drive for the parking wheel;

FIG. 11 is a view similar to that of FIG. 10 but illustrating another form of drive for the parking wheel;

DESCRIPTION OF PREFERRED EMBODIMENTS

Figure 1:
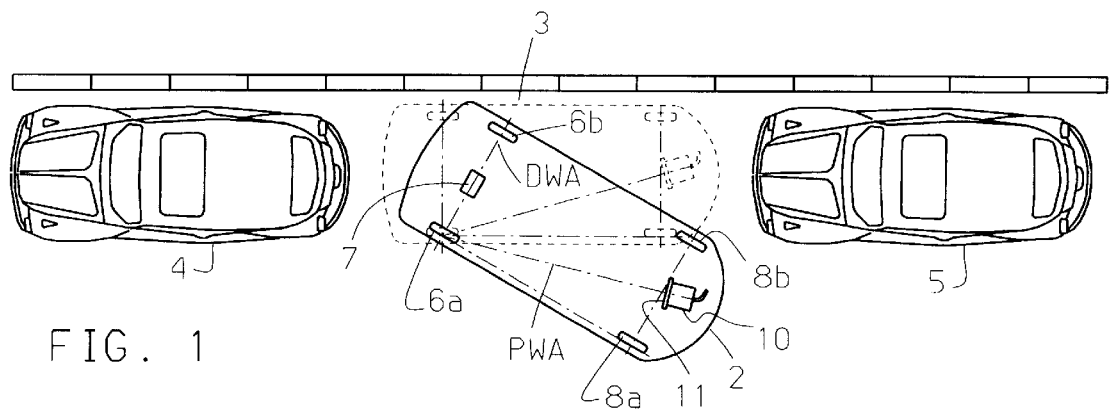
FIG. 1 illustrates a vehicle equipped with a parking device constructed in accordance with the present invention and showing how the parking device may be used for parking a vehicle.

FIG. 1 illustrates the manner in which the parking device of the present invention may be used to faciliate parking a wheeled vehicle 2 within a very small space 3 between two already parked vehicles 4 and 5. In this example, the vehicle 2 to be parked has a front-wheel drive, including two front wheels 6a, 6b coupled to the engine via a differential transmission 7, and two rear wheels 8a, 8b. The parking device, generally designated 10, is fixed to the rear end of the vehicle understructure between the two rear wheels 8. The parking device includes a parking wheel 11 which, when in its deployed condition, is located such that its rotary axis PWA intersects the rotary axis DWA of the two front drive wheels 6a, 6b, at the center of the outer (i.e., driver's side) front wheel 6a.

When the vehicle is to be parked, the driver drives the front end of the vehicle into the parking space 3, as shown in FIG. 1, and deploys the parking device to the fully deployed condition (illustrated in FIGS. 6 and 7) to bring its parking wheel 11 into engagement with the ground and to lift the rear end of the vehicle off the ground. As the vehicle is slowly driven forwardly while the two front drive wheels 6a, 6b are straight, i.e., parallel to the vehicle longitudinal axis, the transmission differential 7 in the front wheel drive will cause front wheel 6a to pivot on the spot, and the rear end of the vehicle to move on the parking wheel in the lateral direction, to bring the rear end of the vehicle into the parking space 3.

Figure 2:
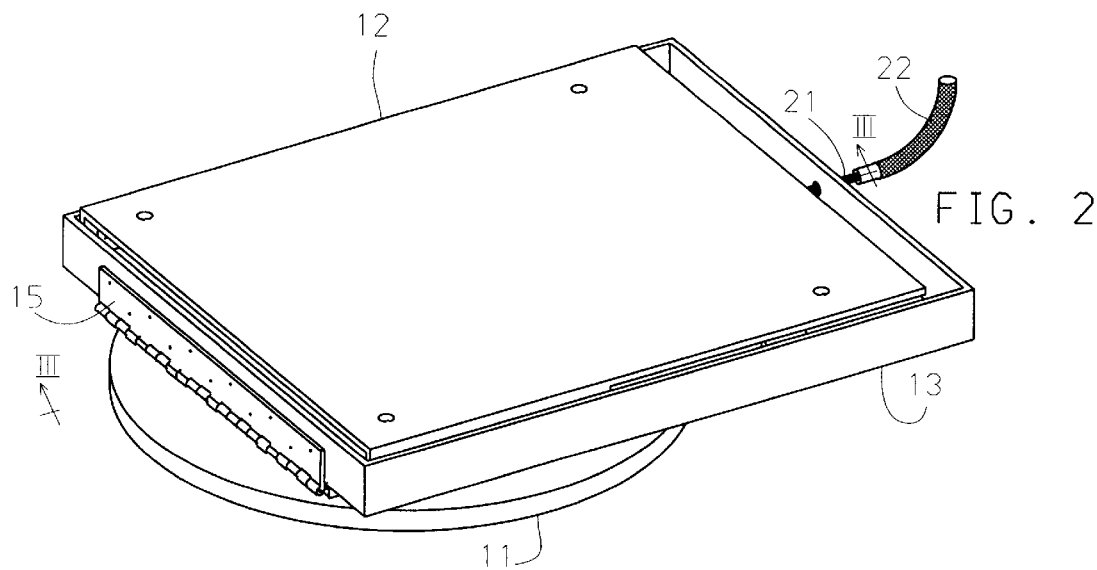
FIG. 2 is a perspective view illustrating the parking device of FIG. 1 in its fully retracted, compact condition.
Figure 3:
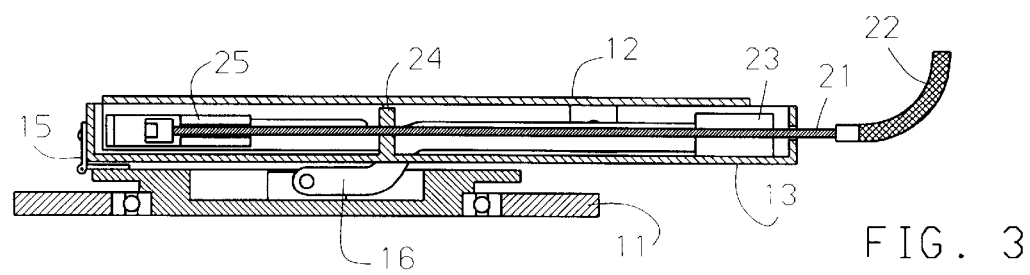
FIG. 3 is a longitudinal sectional view along line III—III of FIG. 2.
Figure 4:
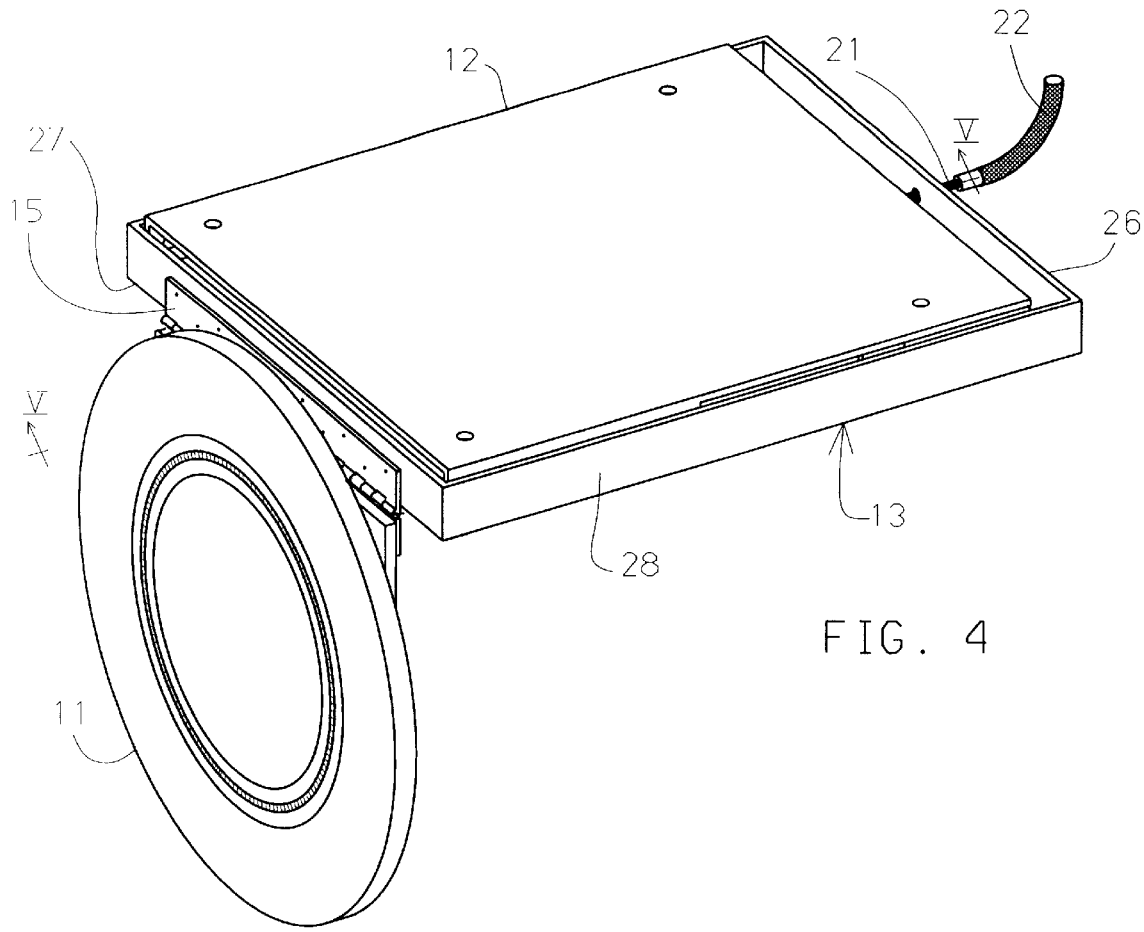
FIG. 4 illustrates the parking device in the partially-deployed condition, wherein only the parking wheel is deployed.
Figure 5:
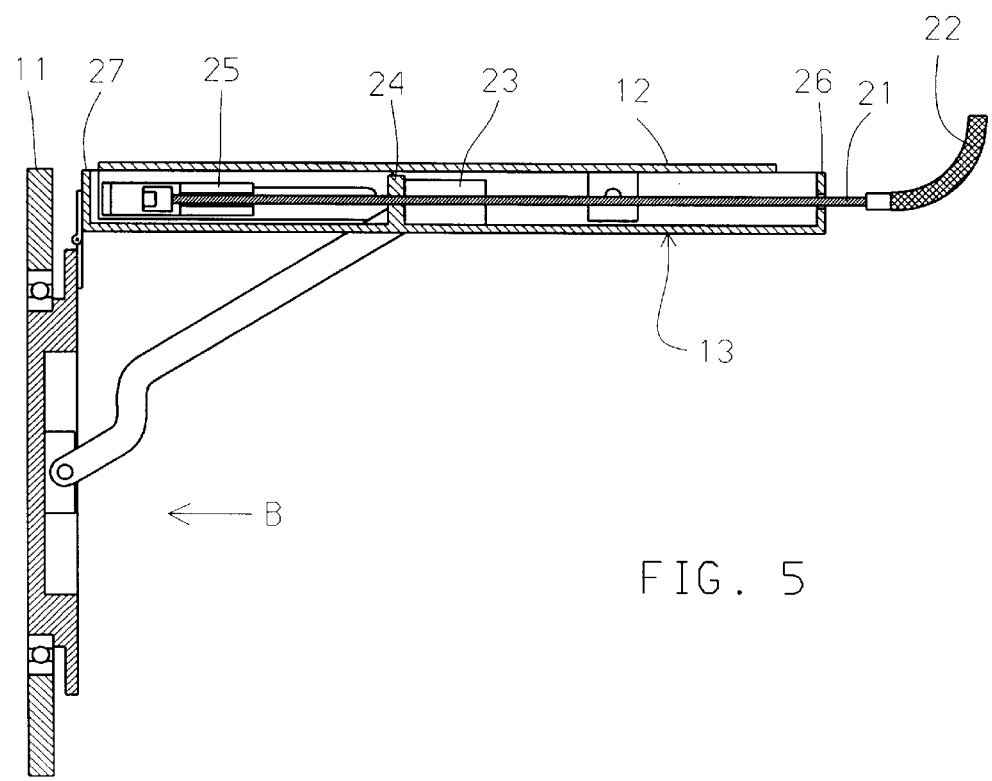
FIG. 5 is a sectional view along line V—V of FIG. 4.

The construction of the parking device 10 is best seen in FIGS. 6 and 7 illustrating its fully deployed condition. Thus, the parking device 10 includes, in addition to the parking wheel 11, a mounting plate 12 for mounting the device to the rear end of the vehicle understructure, and a carriage 13 carrying the parking wheel 11. Carriage 13 is coupled to the mounting plate 12 by a scissors-type coupling mechanism 14 which supports the carriage in a horizontal position adjacent to the mounting plate 12 in the fully retracted condition of the parking device as illustrated in FIGS. 2 and 3. The parking wheel 11 is hingedly mounted to one end of the carriage 13 by hinge 15. It is pivotal by linkage 16 either to the fully deployed position illustrated in FIGS. 6 and 7 wherein it is substantially perpendicular to carriage 13 for engagement with the ground, or to a folded, fully retracted position illustrated in FIGS. 2 and 3, wherein it is substantially horizontal as its carriage 13.

A common drive, generally designated 20, is provided to move both the parking wheel 11 and its carriage 13 either to their retracted positions (FIGS. 2, 3) or to their deployed positions (FIGS. 6, 7). Drive 20 may include a 12-volt DC motor energized by the vehicle battery. It includes a screw 21 rotated by a flexible coupling 22 and threaded in a nut 23 movable along the upper face of carriage 13. Screw 21 is passed through a bore in a stop 24 fixed to the upper face of carriage 13, and also passes through a bore in a slide 25 movable along the upper face of the carriage.

Carriage 13 is of rectangular (e.g., square) configuration and includes upstanding flanges 26–29 along its outer borders. Stop 24 is fixed substantially midway between the two opposed flanges 26, 27. Flange 26 is formed with a hole 30 for accommodating the screw 21; flange 27 has the hinge 15 attached to it for hingedly mounting the parking wheel 11; and flanges 28 and 29 are used for coupling carriage 13 to the mounting plate 12 by means of the scissors mechanism 14.

As will be described more particularly below, nut 23 is movable by the rotation of screw 21 between flange 26 and the fixed stop 24. The nut is coupled by linkage 16 to the parking wheel 11 such that, when the nut is adjacent to flange 26, the parking wheel 11 is in its folded, fully retracted position (FIGS. 2 and 3); and when the nut is adjacent to stop 24, the parking wheel is in its fully deployed position with respect to the carriage (FIGS. 4–8).

Slide 25 is movable between fixed stop 24 and flange 27 at the opposite end of carriage 13. Slide 25 is coupled to the scissors mechanism 14 such that when the slide is adjacent to flange 27 the carriage is in its fully retracted position (FIGS. 2–5); and when the slide is adjacent to stop 24, the carriage is in its fully deployed position (FIGS. 6 and 7).

The scissors mechanism 14 includes a pivotal rod 31 extending transversely across slide 25 and fixed at its opposite ends to a pair of bars 32a, 32b on opposite sides of the carriage 13 joined together by a crossplate 32c extending transversely across the carriage. A second pair of bars 33a, 33b are joined together by a crossplate 33c also extending transversely across the carriage. Bars 33a, 33b are pivotally coupled at their centers 34, 35 to bars 32a, 32b and at one of their ends 28a, 29a to the two flanges 28, 29 of the carriage 13. The opposite ends of bars 32a, 32b are pivotally mounted to mounting plate 12. The opposite ends of bars 33a, 33b carry pins 36 movable within slots 37 formed in flanges 38 depending from the opposite sides of mounting plate 12. Such a construction provides a strong compact scissors arrangement for moving the carriage 13 with respect to the mounting plate 12.

Screw 21 is threaded through nut 23 so that the rotation of the screw will displace either the nut with respect to the screw, or the screw with respect to the nut. Screw 21 passes through unthreaded bores in stop 24 and slide 25; it is coupled to the slide such that rotation of the screw will not rotate the slide, but linear movement of the screw in either direction will effect a corresponding linear movement of the slide.

Thus, as shown particularly in FIGS. 6 and 9a–9e, slide 25 includes an end wall 99 joined to the opposite sides of the slide by a pair of side walls 41, 42, defining a cavity 43. Screw 21 freely passes through slide 25, and the end of the screw received within cavity 43 is provided with a sleeve 45 formed within internal threads receiving the threads of the screw. A transverse pin 46 fixes sleeve 45 to the respective end of screw 21 so that sleeve 45 will rotate with the screw.

The inner surface 47 of sleeve 45 serves as a first bearing surface engageable with bearing surface 48 of slide 25 such that when screw 21 is linearly displaced in one direction (rightwardly in FIGS. 9a–9e), bearing surface 47 of sleeve 45 engages surface 48 of the slide 25 to pull the slide towards stop 23. When screw 21 is linearly displaced in the opposite direction (leftwardly in FIGS. 9a–9e), the outer surface 49 of sleeve 45 serves as a second bearing surface engageable with a bearing surface 40 of end wall 99 of the slide 25, to push the slide in the opposite direction away from stop 23.

As can be seen particularly in FIGS. 9a–9e, the length of sleeve 45 is slightly less than the distance between bearing surfaces 48 and 40 of slide 25. Thus, when the screw is linearly displaced leftwardly, there will be a small gap between bearing surfaces 47 and 48 as shown at $G_1$ in FIG. 9a; and when the screw is displaced rightwardly, there will be a small gap between bearing surfaces 49 and 40, as shown at $G_2$ in FIG. 9b.

The overall operation of the parking device illustrated in FIGS. 1–8 will now be described particularly with reference to FIGS. 9a–9e.

FIG. 9a illustrates the parking device in its fully retracted condition, wherein the parking wheel 11 is in its folded horizontal position as shown in FIGS. 2 and 3; nut 23 is adjacent to flange 26 at one side of carriage 13; the carriage 13 is in its fully retracted position as also illustrated in FIGS. 2 and 3; and slide 25 is adjacent to flange 27 at the opposite side of carriage 13. It will be seen that in this fully retracted condition of the parking device, it produces a very low profile, is barely visible, and produces a very low areodynamic resistance during the normal operation of the vehicle.

When it is desired to deploy the parking device, screw 21 is rotated in one direction by flexible coupling 22 such as to move nut 23 from carriage flange 26 towards the carriage fixed stop 24. To assure that nut 23 will start to move before slide 25, the scissors mechanism 14 is designed to impose some resistance towards its opening and closing. FIGS. 6 and 7 illustrate one way of doing this, namely by threading a pin 50 through one of the bars of the scissors mechanism to engage the other bar with a pressure corresponding to the amount of threading of the pin.

During the movement of nut 23 towards stop 24, linkage 16 pivots parking wheel 11 about the axis of hinge 15 from the horizontal position of the wheel towards its vertical deployed position, which is reached when nut 23 engages stop 24 (FIG. 9b). In this deployed position of the parking wheel, the carriage is still in its retracted condition, so the parking wheel is spaced above the ground.

When nut 23 reaches fixed stop 24, the latter prevents the nut from moving further. Therefore, continued rotation of the screw 21 causes the screw to move outwardly (rightwardly, FIGS. 9a–9e) with respect to the nut. As the screw moves outwardly of the nut, bearing surface 47 of sleeve 45, fixed to the end of the screw, engages bearing surface 48 of slide 25, to thereby pull slide 25 in the same direction of displacement of the screw. This movement of slide 25 opens the scissors mechanism 14, and thereby displaces carriage 13 downwardly away from mounting plate 12, to lower the parking wheel 11 until it engages the ground. When the parking wheel engages the ground, continued rotation of the screw 21 will move carriage 13 further away from mounting plate 12, thereby raising the rear end of the vehicle to lift it off the ground. FIG. 9c illustrates the condition when the carriage 13 is in its fully deployed condition as shown in FIGS. 6 and 7, where the slide 25 is adjacent to the stop 24.

When both the carriage 13 and the parking wheel 11 have thus been moved to their fully deployed positions, the weight of the rear end of the vehicle is now supported solely by parking wheel 11. Accordingly, the driver, after having previously steered the vehicle into the parking place as shown in FIG. 1 with the front wheels 6a, 6b straight, may now drive forwardly. The differential transmission causes the rear end of the vehicle, moving on parking wheel 11, to shift laterally into the parking space 3, while the outer front wheel 6a pivots about its spot, as described above with respect to FIG. 1.

The parking device may then be actuated to retract both the parking wheel 11 and the carriage 13 by rotating screw 21 in the opposite direction. Since the parking wheel 11 is in engagement with the ground, during the initial rotation of screws 21, nut 23 will remain against stop 24, thereby allowing the screw to move (leftwardly in FIGS. 9a–9e) with slide 25 (FIG. 9d). Bearing surface 49 of sleeve 45 at the tip of the screw engages bearing surface 40 of the slide, to thereby push the slide in the opposite direction (FIG. 9e). This starts the carriage 13 to move towards its retracted position to lower the rear end of the vehicle. As soon as the rear wheels 8 of the vehicle take up the weight of the rear end of the vehicle, nut 23 will begin to move away from stop 24. Links 16 coupling parking wheel 11 to nut 23 cause the parking wheel to pivot on its hinge 15 to its folded, retracted horizontal position as shown in FIGS. 2 and 3, which position is reached when nut 23 is adjacent carriage flange 26. As soon as this occurs, continued rotation of the screw 21 will cause bearing surface 49 at the tip of the screw to push against wall 40 of the slide 25, and thereby to move the slide to its initial position adjacent to carriage flange 27 as illustrated in FIG. 9a, thereby completing the retraction of the parking device.

It will be appreciated that the parking device also facilitates the exiting of the vehicle from the parking space by following the reverse procedure. Thus, the parking device is deployed in the same manner as described above, and the front wheel drive of the vehicle is operated in the reverse direction such that the vehicle transmission swings the rear end of the vehicle outwardly of the parking space, whereupon the parking device may then be retracted and the vehicle driven in reverse.

In the above-described embodiment, the parking device is devoid of a drive for the parking wheel since it utilizes the front wheel drive for this purpose. FIGS. 10 and 11 illustrate two variations wherein the parking wheel is provided with a separate parking wheel drive, e.g., where the vehicle has a rear-wheel drive. In FIG. 10, the parking wheel, therein designated 51, is provided with an external gear 52 which meshes with a worm gear 53 rotated by a flexible coupling 54. In FIG. 11, the parking wheel 60 is provided with an inner ring gear 61 meshing with a pinion gear 62 driven by a flexible coupling 63. In all other respects, the parking devices illustrated in FIGS. 10 and 11 are constructed and operate in the same manner as described above.

Figures 12, 13:
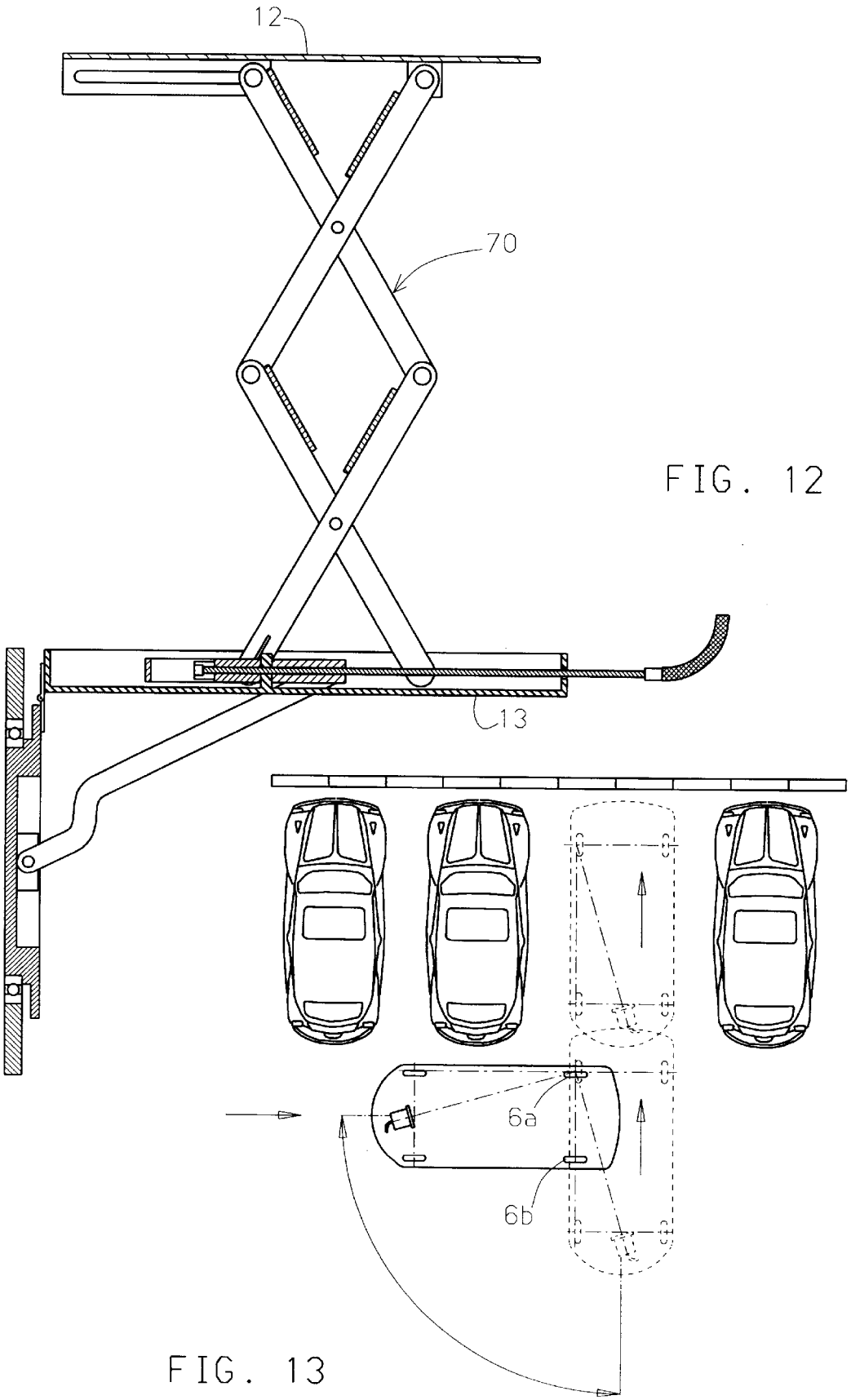
FIG. 12 is a side elevational view illustrating another type of coupling mechanism for deploying the carriage.
FIG. 13 is a top plan view illustrating another manner in which the described parking device may be used for parking a vehicle particularly in parking lots.

FIG. 12 illustrates a variation in the carriage-deployment mechanism, namely a double-scissors mechanism 70, for coupling the carriage 13 to the mounting plate 12. Such a mechanism is particularly useful where the vehicle requires large carriage displacements.

FIG. 13 illustrates how the parking device may be used for entering narrow parallel-type parking spaces, particularly in parking lots. In this case, the vehicle is driven so as to align its longitudinal axis perpendicular to the axis of the parking space, with front wheel 6a of the vehicle aligned with the end of the parking space. The vehicle can therefore enter the parking space, and also leave it, by deploying the parking wheel of the parking device in the manner as described above.

While the invention has been described with respect to several preferred embodiments, it will be appreciated that these are set forth merely for purposes of example, and that many variations may be made. For example, instead of providing a mounting plate 12, the parking device may be mounted by other means, such as by fastening bolts for attaching the parking device to the understructure of the vehicle. Other types of mechanisms may be used for retracting and deploying the carriage, and also for folding the deploying the parking wheel. Many other variations, modifications and applications of the invention will be apparent.

I claim:

1. A parking device attachable to a first end of an understructure of a wheeled vehicle for use in parking the vehicle, comprising:

mounting means for mounting the parking device to the vehicle understructure;

a carriage coupled to said mounting means by a coupling mechanism which permits the carriage to move either to a retracted position adjacent to said mounting means or to a deployed position vertically spaced from said mounting means;

a parking wheel carried by said carriage by a pivotal mechanism which permits the parking wheel to be pivoted either to a folded, substantially horizontal position with respect to the carriage, or to a deployed substantially vertical position with respect to the carriage, to engage the ground in such manner to permit the first end of the vehicle to move in the transverse direction with respect to the vehicle;

and a drive coupled to said carriage and to said parking wheel and effective, when the carriage is in its retracted position and the parking wheel is in its folded position, to move the parking wheel to its deployed position with respect to said carriage, and then to move the carriage to its deployed position lowering the parking wheel into engagement with the ground and raising the first end of the vehicle off the ground.

2. The device according to claim 1, wherein said drive is a screw and nut drive.

3. The device according to claim 2, wherein said screw and nut drive comprises:

a stop fixed with respect to the carriage;

a nut on one side of said stop and movable towards and away therefrom, said pivotal mechanism being coupled to said nut;

a slide on the opposite side of said stop and movable towards and away therefrom, said coupling mechanism coupling the carriage to the mounting means being coupled to said slide;

and a screw threaded through said nut and coupled to said slide such that, when the carriage is in its retracted position, and the parking wheel is in its folded retracted position, rotation of the screw in one direction first moves the nut towards the stop to deploy the parking wheel, and when the nut engages the stop, further rotation of the screw in the same direction moves the screw axially thereof to withdraw from the nut and thereby to move the slide towards the stop to deploy the carriage.

4. The device according to claim 3, wherein said screw is coupled to the slide by a coupling which moves the slide axially with the axial movement of the screw but permits the screw to rotate freely with respect to the slide.

5. The device according to claim 4, wherein said screw is coupled to said slide by a bearing sleeve fixed to an end of the screw and having a first bearing surface engageable with a first bearing surface of the slide when the screw withdraws from the nut to pull the slide and thereby to move the carriage to its deployed position, and a second bearing surface engageable with a second bearing surface of the slide when the screw extends into the nut to push the slide and thereby to move the carriage to its retracted position.

6. The device according to claim 5, wherein said bearing sleeve is pinned to a tip of the screw and is of a length slightly less than the distance between said first and second bearing surfaces of the slide.

7. The device according to claim 1, wherein said mounting means is a mounting plate attachable to the vehicle understructure.

8. The device according to claim 1, wherein said coupling mechanism coupling the carriage to the mounting means is a scissors mechanism.

9. The device according to claim 8, wherein said scissors mechanism comprises:

a first pair of bars each having a first end and an opposite end, said first pair of bars being pivotally mounted at their first ends to opposite sides of said mounting means, said first pair of bars further being movably coupled at their opposite ends to said carriage;

and a second pair of bars each having a first end, a mid-portion and an opposite end, said second pair of bars being pivotally coupled at their first ends to opposite sides of said carriage, at their mid-portions to mid-portions of the first pair of bars, and at their opposite ends to pins movable within slots in said mounting means.

10. The device according to claim 9, wherein said first and second pairs of bars are joined together by first and second crossplates extending transversely across said carriage.

11. The device according to claim 1, further including a parking wheel drive comprising a worm gear meshing with an external gear carried by said parking wheel.

12. The device according to claim 1, further including a parking wheel drive comprising a pinion gear meshing with an internal gear carried by said parking wheel.

13. A parking device attachable to a first end of an understructure of a wheeled vehicle for use in parking the vehicle, comprising:

mounting means attachable to the vehicle understructure;

a carriage coupled to said mounting means by a coupling mechanism which permits the carriage to move either to a retracted position adjacent to the mounting means or to a deployed position vertically spaced from said mounting means;

a parking wheel carried by said carriage by a pivotal mechanism which permits the parking wheel to be pivoted either to a folded, substantially horizontal position or to a deployed, substantially vertical position oriented to engage the ground in such manner to permit the first end of the vehicle to move in the transverse direction with respect to the vehicle;

and a screw and nut drive coupled to said carriage and to said parking wheel and effective, when the carriage is in its retracted position and the parking wheel is in its folded position, to move the parking wheel to its deployed position, and then to move the carriage to its deployed position lowering the parking wheel into engagement with the ground and raising the first end of the vehicle off the ground.

14. The device according to claim 13, wherein said screw and nut drive comprises:

a stop fixed with respect to the carriage;

a nut on one side of said stop and movable towards and away therefrom, said pivotal mechanism being coupled to said nut;

a slide on the opposite side of said stop and movable towards and away therefrom, said coupling mechanism coupling the carriage to the mounting means being coupled to said slide;

and a screw threaded through said nut and coupled to said slide such that, when the carriage is in its retracted position, and the parking wheel is in its folded, retracted position, rotation of the screw in one direction first moves the nut towards the stop to deploy the parking wheel, and when the nut engages the stop, further rotation of the screw in the same direction moves the screw axially thereof to withdraw from the nut and thereby to move the slide towards the stop to deploy the carriage.

15. The device according to claim 14, wherein said screw is coupled to the slide by a coupling which moves the slide axially with the axial movement of the screw but permits the screw to rotate freely with respect to the slide.

16. The device according to claim 15, wherein said screw is coupled to said slide by a bearing sleeve fixed to an end of the screw and having a first bearing surface engageable with a first bearing surface of the slide when the screw withdraws from the nut to pull the slide and thereby to move the carriage to its deployed position, and a second bearing surface engageable with a second bearing surface of the slide when the screw extends into the nut to push the slide and thereby to move the carriage to its retracted position.

17. The device according to claim 16, wherein said bearing sleeve is pinned to a tip of the screw and is of a length slightly less than the distance between said first and second bearing surfaces of the slide.

18. The device according to claim 13, wherein said mounting means is a mounting plate, and said coupling mechanism coupling the carriage to the mounting means is a scissors mechanism.

19. The device according to claim 18, wherein said scissors mechanism comprises:

a first pair of bars each having a first end and an opposite end, said first pair of bars being pivotally mounted at their first ends to opposite sides of said mounting means, said first pair of bars further being movably coupled at their opposite ends to said carriage;

and a second pair of bars each having a first end, a mid-portion and an opposite end, said second pair of bars being pivotally coupled at their first ends to opposite sides of said carriage, at their mid-portions to mid-portions of the first pair of bars, and at their opposite ends to pins movable within slots in said mounting means.

20. The device according to claim 19, wherein said first and second pairs of bars are joined together by first and second crossplates extending transversely across said carriage.

* * * * *